United States Patent [19]

Huang

[11] Patent Number: 5,084,146

[45] Date of Patent: Jan. 28, 1992

[54] METHOD FOR PREPARING PERFLUOROPOLYETHERS

[75] Inventor: Hsu-Nan Huang, Newark, Del.

[73] Assignee: E. I. Du Pont de Nemours and Company, Wilmington, Del.

[21] Appl. No.: 509,416

[22] Filed: Apr. 9, 1990

[51] Int. Cl.$^5$ ............................................. C25B 3/00
[52] U.S. Cl. ................................. 204/59 F; 204/72; 204/73 R
[58] Field of Search ..................... 204/72, 73 R, 59 F

[56] References Cited

U.S. PATENT DOCUMENTS

| | | | |
|---|---|---|---|
| 3,962,348 | 6/1976 | Benninger et al. | 568/204 |
| 4,118,398 | 10/1978 | Martini | 260/340 |
| 4,788,350 | 11/1988 | Lagow | 568/252 |
| 4,847,427 | 7/1989 | Nappa | 568/615 |

FOREIGN PATENT DOCUMENTS

| | | |
|---|---|---|
| 0302392 | 7/1988 | European Pat. Off. . |
| 3828848 | 3/1990 | Fed. Rep. of Germany . |
| 103334 | 6/1983 | Japan . |

OTHER PUBLICATIONS

Synthesis of αH, ωH-Fluorinated Paraffins from ωH--Fluorinated Acids by the *Kolbe Reaction*, A. I. Levin et al., pp. 1778-1781, Oct. 1965.

"Hoechst High Chem Products for the Electronic Industry", Hoechst Aktiengesellschaft Verkauf Chemikalien, Oct. 1987.

*Primary Examiner*—John Niebling
*Assistant Examiner*—Steven P. Marquis

[57] ABSTRACT

A method for preparing perfluoropolyether oligomers comprising electrochemical coupling of perfluorocarboxylic acid salts or mixtures thereof in aqueous methanol under controlled conditions to produce perfluoropolyether oligomers.

9 Claims, No Drawings

1

METHOD FOR PREPARING PERFLUOROPOLYETHERS

BACKGROUND OF THE INVENTION

The present invention relates to a method for preparing perfluoropolyether oligomers, and, more particularly, to a method of electrochemical coupling of perfluorocarboxylic acid salts or mixtures thereof in aqueous methanol under controlled conditions to produce perfluoropolyether oligomers.

Perfluoropolyethers possess excellent chemical and thermal stability which ensures a wide field of application for these compounds. They are useful as heat transfer media, sealing liquids, lubricants under extreme chemical conditions, additives for oils and greases, turbine propellents and hydraulic liquids. They exhibit low dielectric constants, high breakdown voltages and low loss factors in alternating fields, which makes them particularly suited for applications in the electrical area. In the electronics industry, for example, perfluoropolyethers are particularly useful as vapor phase soldering fluids. They also find applications as convection cooling liquids in transformers or similar devices. Their excellent dissolving power for oxygen and carbon dioxide enables them to be used as oxygen conveyers in heart-lung machines and also directly as blood substitutes in living organisms. These products also find applications in many spheres of nuclear and chemical engineering. Because of their outstanding chemical resistance they are superior to the propylene oxide fluids that hitherto dominated these application fields, especially at temperatures above 200° C.

The compositions prepared by the process of the present invention are described in U.S. Pat. No. 3,214,478, which according to the reference the compositions are obtained by exposing low molecular weight perfluoropolyethers to ultraviolet irradiation. The reaction times ranging from 32 hours to seven days may be unsuitable for economic commercial manufacture. Further, U.S. Pat. No. 4,052,277 describes a photochemical process for preparing perfluorinated polyethers from perfluorocarbonyl compounds, which require exposure times from 10 to 20 hours and result in carbon monoxide being produced.

Electrolytic condensation or electrochemical coupling of carboxylic acids, also known as the Kolbe process, offers an economical route in the preparation process. For example, U.S. Pat. No. 2,760,926 describes hydrocarbon aliphatic ethers prepared by electrolysis of salts of aliphatic carboxylic acids under anhydrous or substantially anhydrous conditions. Lower monohydric and dihydric alcohols, such as methanol, are used as solvents. Further, the application of the Kolbe process to a continuous electrolytic cell with less than 20% molar degree of neutralization of the carboxylic acid is described in U.S. Pat. No. 3,787,299. Adverse gas-filling effects of the Kolbe process are diminished by limiting the distance between the electrodes to synthesize difunctional compounds from substituted but not alpha-substituted alkanoic acids. The compounds produced are useful as intermediates in manufacturing polyamides or polyesters and in manufacturing special plasticizers or ester oils.

Finally, Japanese Kokai Patent No. SHO 61-21610 (1986) describes 37 to 64% yields of the objective perfluoropolyether by electrolyzing a perfluoroalkoxycarboxylic acid or its soluble salt, such as sodium, potassium, lithium, ammonium or magnesium, in a polyhydric alcohol solvent such as ethylene glycol. The reference states that if methanol or water-containing methanol are employed as solvents, it is virtually impossible to synthesize the objective perfluoropolyether. The compounds produced are used to develop synthetic blood.

It has been discovered that aqueous methanol can be employed as a solvent in the process of the present invention. During electrolysis, however, gel formation around the electrodes is a major obstacle for commercial scale electrolysis. It has further been discovered that maintaining the electrolysis under carefully controlled conditions, the gel formation is substantially reduced to give a practical, commercial, feasible process. The electrochemical coupling of the salts of carboxylic acids derived from perfluoropolyethers or mixtures thereof in aqueous methanol under controlled conditions constitutes an economical route in the process of the present invention.

SUMMARY OF THE INVENTION

The invention is directed to a method for preparing perfluoropolyether oligomers, and to a method of electrochemical coupling of perfluorocarboxylic acid salts or mixtures thereof in aqueous methanol under controlled conditions to produce perfluoropolyether oligomers in high yields.

The process for carrying out the invention comprises the steps of:

(a) preparing a solution of perfluorocarboxylic acid salts or mixtures (b) electrolyzing the solution under controlled conditions; and (c) separating, washing, drying and purifying the perfluoropolyether oligomers.

The aqueous methanol solvent comprises 15 to 75 vol % methanol. The perfluorocarboxylic acid salts or mixtures thereof are the K, Rb, Cs or NH$_4$ salts of a perfluorocarboxylic acid of the general formula:

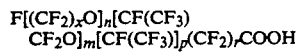

$$F[(CF_2)_xO]_n[CF(CF_3)CF_2O]_m[CF(CF_3)]_p(CF_2)_rCOOH$$

wherein x=2 to 4;

n or m=0 to 4 with the proviso that both are not 0;

p=0 or 1 with the proviso that if m is >0 then p=1; and r=0 to x−1 with the proviso that either r or p is 0 but not both, and if n is >0, then r is >0.

The concentration of the perfluorocarboxylic acid salt is between 5 and 40 vol % of the solution. Alternatively, the perfluorocarboxylic acid/base molar ratio is between 0.9 to 1.1.

The solution is at a pH in the range of from 6 and 12 and is electrolyzed at a temperature in the range of from 0° to 60° C. with a current density in the range of between 0.1 to 1.5 amps/cm$^2$. The distance between the electrodes is in the range of between 0.5 to 10 mm.

DETAILED DESCRIPTION OF THE INVENTION

The invention relates to a method of electrochemical coupling of perfluorocarboxylic acid salts or mixtures thereof in aqueous methanol under controlled conditions to produce perfluoropolyether oligomers, for example, fully fluorinated hexafluoropropylene oxide oligomers in high yields. Typically, the perfluoropolyethers oligomers have a molecular weight of less than 1700. The process is illustrated by the following equation:

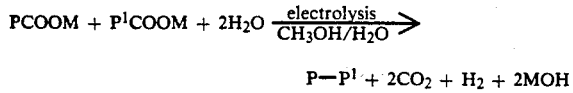

$$P-P^1 + 2CO_2 + H_2 + 2MOH$$

wherein
$P$ or $P^1 = CF_3CF_2CF_2O$

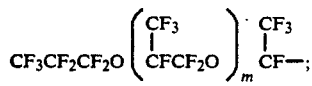

$M = K$, Rb, Cs or $NH_4$; and
$m = 0$ to 3.

Carboxylic acid derivatives of fully fluorinated polyethers, i.e., perfluorocarboxylic acids are starting materials for the process of the invention. The perfluorocarboxylic acids can be described by the general formula:

$$F[(CF_2)_xO]_n[CF(CF_3)CF_2O]_m[CF(CF_3)]_p(CF_2)_rCOOH$$

wherein
$x = 2$ to 4;
$n$ or $m = 0$ to 4 with the proviso that both are not 0;
$p = 0$ or 1 with the proviso that if $m$ is $>0$ then $p = 1$; and
$r = 0$ to $x-1$ with the proviso that either $r$ or $p$ is 0 but not both, and if $n$ is $>0$, then $r$ is $>0$.

For example, the fully fluorinated hexafluoropropylene oxide oligomers perfluoro-2-methyl-3-oxahexanoic acid, (i.e., $x=3$, $n=1$, $m=0$, $p=1$ and $r=0$) perfluoro-2,5-dimethyl-3,6-dioxanonanoic acid (i.e., $x=3$, $n=1$, $m=1$, $p=1$ and $r=0$) and perfluoro-2,5,8-trimethyl-3,6,9-trioxadodecanoic acid (i.e., $x=3$, $n=1$, $m=2$, $p=1$ and $r=0$) are suitable starting materials. Also, mixtures of two or more perfluorocarboxylic acids can be used and the perfluoropolyether oligomers produced are mixtures derived from the coupling combinations of the starting materials.

The salts of the perfluorocarboxylic acids or mixtures thereof are formed by first preparing a solution of hydroxides of potassium, rubidium, cesium or ammonium in methanol or aqueous methanol. The hydroxides of K, Rb, Cs and $NH_4$ are used to neutralize the perfluorocarboxylic acids and resulting salts are electrolyzed to produce the desired high yields of the perfluoropolyether oligomers. For example, a perfluoropolyether oligomer, i.e., perfluoro-5,8,9,12-tetramethyl-4,7,10,13-tetraoxahexadecane is produced by electrolyzing the potassium salt of perfluoro-2,5-dimethyl-3,6-dioxanonanoic acid in aqueous methanol. Lithium and sodium hydroxides, however, lead to gel formation and reduced yields.

Next, the solution is added slowly to the perfluorocarboxylic acid starting material with cooling and agitation. A sufficient amount of hydroxide should be added to neutralize the perfluorocarboxylic acid. When the addition is complete, deionized water is added to create the desired solvent and the pH is adjusted again to neutral. Although satisfactory results can be obtained at a pH of less than 6, it is desirable that the pH be in the range of 7 and 12, typically 7 and 9. It has been discovered that the aqueous methanol solvent helps achieve the high yields obtained by the process of the invention.

The perfluorocarboxylic acid salts are not sufficiently soluble in water, and methanol is required to prepare a one phase highly conductive electrolyte for practical purposes. Nevertheless, a high methanol concentration, i.e., more than 75 vol %, may introduce side reactions which result in reduced yields and decreased efficiency of the electrolytic process because of gel formation, which coats the electrodes and retards the electrolytic process. If, however, less than 15 vol % of methanol is used, the solubility of the salts is too low for efficient production of the perfluoropolyethers. Thus, an aqueous methanol solvent with 15 to 75 vol % of methanol has been found effective. The concentration of the perfluorocarboxylic acid salt should be 5 to 40 vol % of the solution, typically 20 to 35 vol % of the solution calculated on the volume of liquid acid used prior to in situ neutralization with base to form the salt. Alternatively, the acid/base molar ratio is in the range of 0.9 to 1.1.

It has been discovered that to obtain yields in the range of from 60 to 83 wt % based on the starting material, and to avoid gel formation during electrolysis, the electrolysis is conducted in aqueous methanol under carefully controlled conditions.

After the above solution has been prepared, the solution is electrolyzed using conventional equipment and procedures used in the Kolbe process as described in greater detail in the following examples. For example, the electrolytic cells with platinum foil, gauze or rod can be used as the anode; and platinum, iron, nickel, copper and other conducting solids can be used as the cathode. The distance between the electrodes is in the range of between 0.5 to 10 mm typically from 1 to 5 mm. It is desirable to agitate the solution throughout the electrolysis with a stirrer, circulating pump or passing a stream of inert gas such as nitrogen through the solution. Many types of electrolytic cells may be used to carry out the present invention, such as a cell with electrodes at each end or a cell with the anode and cathode partitioned by a glass diaphragm or ion-exchange membrane which creates a positive and a negative chamber. A continuous electrolytic cell, which is suitable for large scale production is the type described in U.S. Pat. No. 3,787,299, the teachings of which are incorporated herein by reference.

The conditions in which the electrolysis is conducted include an applied voltage in the range of from 5 and 15 volts, typically 6 to 10 volts, and a current density in the range of 0.1 to 1.5 amps/cm$^2$ of the electrode surface. Two to three times the quantity of electricity in theoretical Coulombs required to electrolyze all the perfluorocarboxylic acid salt in the solution is typically supplied to the cell during the electrolysis. The electrolysis is conducted at a temperature range between 0° and 60° C. Although the temperature is not critical within the specified range, ambient temperature is convenient. If the temperature is too high, i.e., about 75° C., the yield is significantly diminished resulting in 10 to 15% of the resulting product; temperatures too low results in diminished solubility of the perfluorocarboxylic acid salt. Typically, the temperature should be sufficiently low to minimize production of by-products.

Finally, the products of electrolysis which result are perfluoropolyether oligomers, carbon dioxide, hydrogen and alkali. The perfluoropolyether oligomers, which are produced in yields of 60 to 83% by the electrolysis, have a low degree of solubility in the aqueous methanol solvent and accumulate as a heavy organic liquid layer at the bottom of the electrolysis cell. This layer is easily separated by phase separation, washed several times by shaking with water, dried by drying agents such as magnesium sulfate or molecular sieves and purified by distillation. The perfluoropolyether oligomers can be analyzed by gas chromatography (GC), infrared (IR), nuclear magnetic resonance (NMR) and mass spectrography (MS). The gaseous by-products such as carbon dioxide may be removed by passing the gas through an alkaline scrubber and the hydrogen may be vented to the atmosphere or burned.

Perfluoropolyether oligomers can be useful in vapor phase heat transfer operations such as vapor phase soldering for the manufacture of printed circuit boards as described in greater detail in U.S. Pat. No. 4,721,578, the teachings of which are incorporated herein by reference.

The following examples serve to illustrate the invention, but are not intended to limit the scope of the invention. Several examples are comparative in nature and depart from the conditions described herein which result in decreased yields of the desired perfluoropolyether oligomers.

EXAMPLE 1

This example describes the preparation of perfluoro-5,8,9,12-tetramethyl-4,7,10,13-tetraoxahexadecane (PFTT) from electrochemical coupling of the potassium salt of perfluoro-2,5-dimethyl-3,6-dioxanonanoic (PFDD) acid.

13 g of potassium hydroxide pellets (purity 85%) was dissolved in 92 ml of methanol. 120 g (0.24 mole) of PFDD acid was poured into a 500 ml round bottom flask equipped with a 200 ml dropping funnel, a magnetic stirrer and a thermometer. The acid was cooled to 5° C. by an external ice/water bath. The previously prepared methanol/KOH solution was then slowly added to the acid with agitation, the temperature of the mixture being kept below 25° C. during the addition. After the addition of the methanol/KOH solution was completed, the slightly acidic solution was neutralized by adding KOH pellets to the flask with continued stirring. The solution was stirred for 30 minutes at ambient temperature. The total volume of the solution was then brought to 250 ml by adding 83 ml of deionized water. The pH of the solution was adjusted to 7 again by adding KOH pellets. The solution, which weighed 280 g, was then transferred into the electrolysis cell.

The electrolysis cell consisted of a 500 ml glass reaction flask equipped with a magnetic stirrer, a water jacket, a thermometer, a water cooled condenser and electrodes. The electrodes were fabricated from 45 mesh platinum gauze and consisted of cylindrical anodes 1.5" and 0.25" I.D. and 1.25 in long co-axial with a cylindrical cathode 0.75" I.D. and 1.25" long. The electrodes were separated by Teflon TM rings at each end. The calculated reaction surface area was about 10 cm$^2$. The exhaust gases from the cell were blended with nitrogen and then vented to atmosphere.

Electrolysis was carried out using around 7.8 volts and 4.2 amperes at a temperature of 43° C. while the solution was being agitated. The theoretical amount of electricity required for complete reaction was 23,160 coulombs. The current was switched off when the coulometer showed 52,500 coulombs had been supplied to the cell. A heavy colorless liquid accumulated at the bottom of the cell, (98.5 g), and no gel formed between the electrodes. The heavy liquid was drained from the cell, washed twice with 50 ml of water and dried over magnesium sulfate for 8 hours. Final purification was carried out by distillation. The boiling point of the product was 215° C.

Analysis using GC, MS, IR, and 19F NMR showed that 90.8% of the heavy liquid was the desired perfluoropolyether (PFTT). The calculated yield, based on the starting PFDD was 82.5%.

EXAMPLES 2-17

These examples describe the preparation of PFTT from PFDD, using the procedure of Example 1 over a broad range of conditions. For comparison purposes, the conditions and the results are summarized in Tables 1 and 2 below.

TABLE 1

Preparation of Solutions for Electrolysis

| Ex. No. | PFDD[1] g | Organic[2] Solvent ml | Water ml | Organic[5] Solvent Vol % | Base Type | g |
|---|---|---|---|---|---|---|
| 1 | 120 | 92 | 83 | 52.6 | KOH | 11.1 |
| 2 | 120 | 140 | 35 | 80 | KOH | 11.1 |
| 3 | 120 | 25 | 86 | 22.5 | KOH | 11.1 |
| 4 | 120 | 50[3] | 128 | 28.1 | KOH | 11.1 |
| 5 | 120 | 50[4] | 83 | 37.6 | KOH | 11.1 |
| 6 | 120 | 50 | 132 | 27.5 | NaOH | 9.2 |
| 7 | 120 | 50 | 121 | 29.2 | KOH | 11.1 |
| 8 | 120 | 50 | 121 | 29.2 | KOH | 11.1 |
| 9 | 120 | 50 | 121 | 29.2 | KOH | 11.1 |
| 10 | 120 | 50 | 125 | 29.2 | KOH | 8.5 |
| 11 | 120 | 50 | 121 | 29.2 | KOH | >11.1 |
| 12 | 120 | 50 | 121 | 29.2 | NH$_4$OH | 8 |
| 13 | 50 | 75 | 143 | 34.4 | KOH | 4.3 |
| 14 | 180 | 75 | 60 | 55.6 | KOH | 16.6 |
| 15 | 120 | 50 | 125 | 28.6 | LiOH | 5.7 |
| 16 | 120 | 50 | 124 | 28.7 | CsOH | 36 |
| 17 | 120 | 50 | 128 | 28.1 | RbOH | 20 |

[1]Perfluoro-2,5-dimethyl-3,6-dioxanonanoic acid
[2]Methanol unless noted otherwise
[3]n-Propanol
[4]n-Butanol
[5][ml of methanol/ml of (methanol + water)] × 100%

TABLE 2

Electrolysis Conditions and Product Yield

| Ex. No. | pH | Temp. °C. | Volts | Amps | Coulombs | PFTT[1] grams | Yield % | Gel Formation |
|---|---|---|---|---|---|---|---|---|
| 1 | 7 | 43 | 7.8 | 4.2 | 52,500 | 89.4 | 82.5 | No |
| 2 | 7 | 42 | 9.2 | 4 | 52,000 | 66.0 | 61 | Yes |
| 3 | 7 | 43 | 7.2 | 4.3 | 51,100 | 66.9 | 61.9 | No |
| 4 | 7 | 42 | 7.2 | 4 | 52,800 | 71.4 | 65.9 | No |
| 5 | 7 | 42 | 10 | 4 | 51,000 | — | 20.8 | No |
| 6 | 7 | 42 | 8 | 4 | 51,500 | 74.3 | 68.6 | Yes |
| 7 | 7 | 45 | 11 | 9 | 54,000 | 75.2 | 69.5 | No |
| 8 | 8 | 75 | 5.5 | 4 | 52,000 | 11.8 | 10.9 | No |
| 9 | 7 | 20 | 9 | 4 | 52,000 | 80.6 | 74.5 | No |
| 10 | 4 | 45 | 8.2 | 4.2 | 52,500 | 82.1 | 75.8 | No |
| 11 | 11 | 40 | 7.3 | 4.2 | 53,000 | 80.3 | 74.1 | No |

TABLE 2-continued

Electrolysis Conditions and Product Yield

| Ex. No. | pH | Temp. °C. | Volts | Amps | Coulombs | PFTT[1] grams | Yield % | Gel Formation |
|---|---|---|---|---|---|---|---|---|
| 12 | 7 | 45 | 6–11 | 2.5–9 | 53,000 | 78.3 | 72.3 | No |
| 13 | 8 | 45 | 9 | 4 | — | 34.4 | 75.7 | No |
| 14 | 8 | 45 | 7 | 4.4 | 98,100 | 125 | 77 | No[2] |
| 15 | 7 | 42 | 9–15 | 2–4 | 26,000 | 28.8 | 26.6 | Yes |
| 16 | 7 | 44 | 6.6–8.6 | 4–7 | 55,000 | 86.5 | 79.9 | No |
| 17 | 7 | 45 | 6.7–7.9 | 4–6.4 | 64,000 | 79.8 | 73.7 | No |

[1] Perfluoro-5,8,9,12-tetramethyl-4,7,10,13-tetra-oxahexadecane
[2] White crystals formed around the reaction flask and between the electrodes.

EXAMPLE 18

This example describes the preparation of a mixture of perfluoropolyethers, PFTT, perfluoro-5,6,9-trimethyl-4,7,10-trioxatridecane, (PFTrTr) and perfluoro-5,6-dimethyl-4,7-dioxadecane, (PFDiDi) from a mixture of PFDD and perfluoro-2-methyl-3-oxahexanoic, (PFMO) acids.

14 g of potassium hydroxide pellets (purity 85%) was dissolved in 50 ml of methanol. 27 g (0.08 mole) of PFMO acid and 80 g (0.16 mole) of PFDD were added to a 500 ml round bottom flask equipped with a 100 ml dropping funnel, magnetic stirrer and a thermometer and the mixture was cooled to 5° C. by an external ice/water bath. The previously prepared methanol/KOH solution was then added slowly to the mixture with agitation. The temperature of the solution was kept below 25° C. during the mixing. The total volume of the solution was brought to 250 ml by the addition of 136 ml of deionized water. The pH of the final solution was 7 and it was transferred into a glass electrolyte reservoir.

The bottom part of this glass reservoir was connected to a circulating pump and then connected through a Gilmont flow meter to a Micro Flow Electrolysis Cell. The discharge from the electrolysis cell was passed through a heat exchanger and then returned to the reservoir. All of the connections were made with ¼" Teflon TM tubing. A water cooled condenser was attached to the top of the reservoir to condense any vapor. The anode of the Micro Flow Electrolysis Cell was Pt coated Nb plate and had a 10 cm² reaction surface area. The cathode was a stainless steel plate. Viton TM gaskets were used to provide leak free seals between the electrodes and the walls of the cell.

The electrolyte was circulated through the Micro Flow Electrolytic Cell system and heated to 42° C. by the heat exchanger. Electrolysis was conducted at around 4 amperes, 5.5 volts and 42° C. The quantity of electricity supplied to the cell was 51,500 coulombs, as measured on a coulometer. A colorless, heavy organic layer separated and was found to weigh 78 g. Based on GC analysis, 45.2% of this layer was PFTT, 37.6% was PFTrTr and 9.8% was PFDiDi.

What is claimed is:

1. A method for preparing perfluoropolyether oligomers comprising the steps of:

(a) preparing a solution of perfluorocarboxylic acid salts or mixtures thereof in an aqueous methanol solvent;
    (b) electrolyzing the solution under controlled conditions to accomplish reduced gel formation and yields in excess of 60%; and
    (c) separating, washing, drying and purifying the perfluoropolyether oligomers.

2. The method of claim 1 wherein the perfluorocarboxylic acid salt comprise a K, Rb, Cs or $NH_4$ salt of a perfluorocarboxylic acid of the general formula:

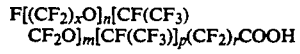

$$F[(CF_2)_xO]_n[CF(CF_3)CF_2O]_m[CF(CF_3)]_p(CF_2)_rCOOH$$

wherein
x = 2 to 4;
n and m = 0 to 4 with the proviso that both are not 0;
p = 0 or 1 with the proviso that if m is >0 then p = 1; and
r = 0 to x−1 with the proviso that either r or p is 0 but not both, and if n is >0, then r is >0.

3. The method of claim 1 or claim 2 wherein the aqueous methanol solvent comprises 15 to 75 vol % methanol with a pH of the solution in the range of from 6 to 12 and a concentration of the perfluorocarboxylic acid salt between 5 and 40 vol % of the solution, measured as the acid.

4. The method of claim 3 wherein the perfluorocarboxylic acid/base molar ratio is between 0.9 to 1.1.

5. The method of claim 3 wherein the solution is electrolyzed at a temperature in the range of from 0° to 60° C. with a current density in the range of between 0.1 to 1.5 amps/cm² and a distance between the electrodes is in the range of between 0.5 to 10 mm.

6. A method for electrochemical coupling of perfluorocarboxylic acid salts or mixtures thereof in an aqueous methanol solvent wherein the solution is at a pH in range of from 6 to 12 and the solution is electrolyzed at a temperature in the range of from 0° to 60° C. with a current density in the range of between 0.1 to 1.5 amps/cm² and a distance between the electrodes is in the range of between 0.5 to 10 mm to yield perfluoropolyether oligomers in excess of 60% and to accomplish reduced gel formation.

7. A method for preparing perfluoropolyether oligomers of the general formula

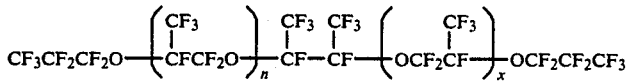

wherein
n or x = 0 to 3 useful in vapor phase heat transfer operations by electrochemical coupling perfluorocarboxylic acid salts or mixtures thereof comprising the steps of:
 (a) preparing a solution at a pH in the range of from 6 to 12 of perfluorocarboxylic acid salts or mixtures thereof in an aqueous methanol solvent comprising 15 to 75 vol % methanol and a concentration of the perfluorocarboxylic acid salt between 5 and 40 vol % of the solution;
 (b) electrolyzing the solution at a temperature in the range of from 0° to 60° C. with a current density in the range of between 0.1 to 1.5 amps/cm² and the distance between the electrodes is in the range of between 0.5 to 10 mm to produce the perfluoropolyether oligomers with yields in excess of 60% and to accomplish reduced gel formation; and
 (c) separating, washing, drying and purifying the perfluoropolyether oligomers.

8. A method of claim 1 or claim 5 or claim 6 or claim 7 wherein the perfluorocarboxylic acid salt is potassium perfluoro-2,5-dimethyl-3,6-dioxanonanoate, potassium perfluoro-2-methyl-3-oxahexanoate, potassium perfluoro-2,5,8-trimethyl-3,6,9-trioxadodecanoate, potassium perfluoro-2,5,8,11-tetramethyl-3,6,9,12-tetraoxapentadecanoate.

9. A method for reducing gel formation in an electrochemical coupling reaction comprising the steps of:
 (a) preparing a solution of perfluorocarboxylic acid salts comprising a K, Rb, Cs or NH₄ salt of a perfluorocarboxylic acid of the general formula:

$$F[(CF_2)_xO]_n[CF(CF_3)CF_2O]_m[CF(CF_3)]_p(CF_2)_rCOOH$$

wherein
x = 2 to 4;
n and m = 0 to 4 with the proviso that both are not 0;
p = 0 or 1 with the proviso that if m is >0 then p = 1; and
r = 0 to x−1 with the proviso that either r or p is 0 but not both, and if n is >0, then r is >0;
and mixtures thereof in an aqueous methanol solvent comprising 15 to 75 vol % with a pH of the solution in the range of from 6 to 12 and a concentration of the perfluorocarboxylic acid salt between 5 and 40 vol % of the solution, measure as the acid;
 (b) electrolyzing the solution at a temperature in the range of from 0° to 60° C. with a current density in the range of between 0.1 to 1.5 amps/cm² and a distance between the electrodes is in the range of between 0.5 to 10 mm to produce the perfluoropolyether oligomers with yields in excess of 60% and to accomplish reduced gel formation;
 (c) separating, washing, drying and purifying a resulting perfluoropolyether oligomer.

* * * * *

UNITED STATES PATENT AND TRADEMARK OFFICE
CERTIFICATE OF CORRECTION

PATENT NO. : 5,084,146

DATED : January 28, 1992

INVENTOR(S) : Hsu-Nan Huang

It is certified that error appears in the above-identified patent and that said Letters Patent is hereby corrected as shown below:

Column 3, line 10, after "P or $P^1=$" delete "$CF_3CF_2CF_2O$".

Column 8, line 64, delete "or" and insert --and--.

Column 9, line 10, after the word "solution" insert --, measured as the acid--.

Column 10, line 20, delete "measure" and insert --measured--.

Signed and Sealed this

Eighth Day of June, 1993

Attest:

MICHAEL K. KIRK

*Attesting Officer*    Acting Commissioner of Patents and Trademarks